United States Patent
Bhagavathiperumal et al.

(10) Patent No.: US 12,067,027 B2
(45) Date of Patent: Aug. 20, 2024

(54) SYSTEM AND METHOD OF CREATING MULTI-VENDOR NETWORK DATA LAKE

(71) Applicant: Aviz Networks, Inc., San Jose, CA (US)

(72) Inventors: Chidambaram Bhagavathiperumal, Livermore, CA (US); Gautam Agrawal, Saratoga, CA (US); Vishal Shukla, San Jose, CA (US)

(73) Assignee: Aviz Networks, San Jose, CA (US)

( * ) Notice: Subject to any disclaimer, the term of this patent is extended or adjusted under 35 U.S.C. 154(b) by 0 days.

(21) Appl. No.: 18/090,771

(22) Filed: Dec. 29, 2022

(65) Prior Publication Data

US 2024/0220510 A1    Jul. 4, 2024

(51) Int. Cl.
*G06F 16/00* (2019.01)
*G06F 16/25* (2019.01)

(52) U.S. Cl.
CPC .................... *G06F 16/254* (2019.01)

(58) Field of Classification Search
CPC .................................... G06F 16/254
See application file for complete search history.

(56) References Cited

U.S. PATENT DOCUMENTS

| | | | | |
|---|---|---|---|---|
| 2007/0106711 | A1* | 5/2007 | Buros | G06F 16/254 |
| 2009/0319658 | A1* | 12/2009 | Chioiu | H04L 43/0817 |
| | | | | 709/224 |
| 2011/0078108 | A1* | 3/2011 | Kumar | G06F 11/3006 |
| | | | | 707/E17.037 |
| 2014/0040182 | A1* | 2/2014 | Gilder | G06F 16/256 |
| | | | | 707/602 |
| 2017/0011104 | A1* | 1/2017 | Hyde | G06F 16/211 |
| 2018/0278500 | A1* | 9/2018 | Feamster | H04L 43/20 |
| 2019/0097901 | A1* | 3/2019 | Saxena | H04L 41/0893 |

* cited by examiner

*Primary Examiner* — Syed H Hasan
(74) *Attorney, Agent, or Firm* — Select IP Law Corporation; Ashkon Cyrus (57) ABSTRACT

The present disclosure provides a system and a method of creating a data lake configured to ingest data from heterogeneous network equipment and provide access to a plurality of applications using any kind of public cloud. In one general aspect, a method to create a data lake may include installing a plurality of agents by an end-user may include a multivendor environment. The method may also include adding a plurality of data sources to be monitored to a collector module, where the plurality of data sources further may include of one or more devices and endpoints. The method may furthermore include establishing a secure connection between the collector module and the plurality of data sources. The method may in addition include collecting, by the collector module, input data from one or more organic agents and one or more vendor specific agents to create collected data.

16 Claims, 4 Drawing Sheets

SYSTEM AND METHOD OF CREATING MULTI-VENDOR NETWORK DATA LAKE

TECHNICAL FIELD

The present disclosure relates to the field of data processing, and more specifically to a system and method for creating a multi-vendor network data lake.

BACKGROUND OF THE DISCLOSURE

There is a dire need for applications that can help organizations forecast, predict and plan for their future in today's world of big data. One problem facing most organizations is the sheer volume of data that organization must process and analyze. This can be overwhelming for traditional data management systems and can require specialized hardware and software to handle the load. Additionally, the complexity of big data can make it difficult to extract valuable insights and make informed decisions.

Another problem with big data is the challenge of integrating data from multiple sources. Organizations often have data scattered across various departments, systems, and even external partners. This can make it difficult to get a complete and accurate picture of the data, as there may be inconsistencies or gaps in the data. Furthermore, the process of integrating and consolidating data from multiple sources can be time-consuming and resource-intensive, requiring specialized skills and tools.

Typical network data centers consist of numerous switches and routers from multiple vendors (including diversity in hardware and software). In such a setting each vendor provides their own monitoring solutions for operational support. This can lead to a fragmented monitoring environment where data is siloed and cannot be easily shared or analyzed across the organization, thus making it difficult to get a comprehensive view of the organization's infrastructure and systems as data from different vendors may not be easily combined or analyzed together.

Another problem faced in the art is that each networking switch vendor hosts their own data lake, thus limiting the applications with their own proprietary data set. Interoperability issues can also make it difficult to switch or upgrade vendors, as it may require significant effort to migrate data and integrate the new solution with the existing monitoring infrastructure.

Therefore, there is a growing need for building a cloud data lake that can efficiently and reliably cover every bit of data from a multi-vendor network infrastructure.

SUMMARY

The present disclosure aims to address and overcome the limitations of the prior art and any other limitations that may become apparent upon reading and understanding the present specification. A system and method of creating multi-vendor network data lake is provided. A data lake is a centralized repository that allows you to store all your structured and unstructured data at any scale.

It is an objective of the present disclosure to provide systems and methods for implementing networking applications that are data-driven, wherein the data is available from all the underlying network endpoints regardless of which vendor supplied that hardware and what operating system is deployed on that hardware.

The present disclosure further provides a system and a method of creating a data lake configured to ingest data from heterogeneous network equipment and provide access to a plurality of applications using any kind of public cloud.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one example, a method to create a data lake may include installing a plurality of agents by an end-user may include a multivendor environment. The method may also include adding a plurality of data sources to be monitored to a collector module, where the plurality of data sources further may include of one or more devices and endpoints. The method may furthermore include establishing a secure connection between the collector module and the plurality of data sources. The method may in addition include collecting, by the collector module, input data from one or more organic agents and one or more vendor specific agents to create collected data.

The method may moreover include normalizing the collected received from the collector module via a normalizer module, where the normalizer module provides normalized data that may include a unified state of the multivendor environment. The method may also include correlating the normalized data via a correlate module, where the correlating further may include noise reduction and creating a stream of targeted data.

The method may furthermore include streaming the targeted data over a secure and reliable channel via a connector module to an endpoint of a multi-tenant cloud platform; where the multi-tenant cloud platform is configured to create a multi-vendor lake and populate for application consumption in raw and tabularized format. Other examples of this aspect include corresponding computer systems, apparatus, and computer programs recorded on one or more computer storage devices, each configured to perform the actions of the methods.

Implementations may include one or more of the following features. The method where the plurality of agents further may include organic agents and vendor specific agents. The method where the plurality of data sources further may include public and private cloud networks. The method where the organic agents extract network state including platform, control plane and data plane, to be delivered to the collector module.

The method where the endpoint of the multi-tenant cloud platform utilizes auto-scaling properties to support a scalable and distributed environment. The method where data is collected by the collector module using a push notification from the organic agents and the vendor specific agents and not a pull notification. Implementations of the described techniques may include hardware, a method or process, or a computer tangible medium.

In one example, system provided herein may include one or more processors configured to install a plurality of agents by an end-user, and may include a multivendor environment. The system may furthermore add a plurality of data sources to be monitored to a collector module, wherein the plurality of data sources further may include of one or more devices and endpoints. The system may in addition establish a secure connection between the collector module and the plurality of data sources. The system may moreover provide a collector module to collect input data from one or more organic agents and one or more vendor specific agents to create collected data. The system may also include normalize the collected received from the collector module via a normalizer module, where the normalizer module provides normalized data may include of a unified state of the multivendor environment. The system may furthermore include correlate the normalized data via a correlate module, where the correlating further may include noise reduction and creating a stream of targeted data. The system may in addition include stream the targeted data over a secure and reliable channel via a connector module to an endpoint of a multi-tenant cloud platform. The system may moreover include where the multi-tenant cloud platform is configured to create a multi-vendor lake and populate for application consumption in raw and tabularized format. Other examples of this aspect include corresponding computer systems, apparatus, and computer programs recorded on one or more computer storage devices, each configured to perform the actions of the methods.

Implementations may include one or more of the following features. A system where the plurality of agents further may include organic agents and vendor specific agents. A system where the plurality of data sources further may include public and private cloud networks. A system where the organic agents extract network state including platform, control plane and data plane, to be delivered to the collector module. A system where the endpoint of the multi-tenant cloud platform utilizes auto-scaling properties to support a scalable and distributed environment. A system where data is collected by the collector module using a push notification from the organic agents and the vendor specific agents and not a pull notification. Implementations of the described techniques may include hardware, a method or process, or a computer tangible medium.

In one general aspect, non-transitory computer-readable medium may include one or more instructions that, when executed by one or more processors of a device, cause the device to: install a plurality of agents by an end-user may include a multivendor environment; add a plurality of data sources to be monitored to a collector module, where the plurality of data sources further may include of one or more devices and endpoints; establish a secure connection between the collector module and the plurality of data sources; collect, by the collector module, input data from one or more organic agents and one or more vendor specific agents to create collected data; normalize the collected received from the collector module via a normalizer module, where the normalizer module provides normalized data may include of a unified state of the multivendor environment; correlate the normalized data via a correlate module, where the correlating further may include noise reduction and creating a stream of targeted data; and stream the targeted data over a secure and reliable channel via a connector module to an endpoint of a multi-tenant cloud platform. A non-transitory computer-readable medium may also include where the multi-tenant cloud platform is configured to create a multi-vendor lake and populate for application consumption in raw and tabularized format. Other examples of this aspect include corresponding computer systems, apparatus, and computer programs recorded on one or more computer storage devices, each configured to perform the actions of the methods.

Implementations may include one or more of the following features. A non-transitory computer-readable medium where the plurality of agents further may include organic agents and vendor specific agents. A non-transitory computer-readable medium where the plurality of data sources further may include public and private cloud networks. A non-transitory computer-readable medium where the organic agents extract network state including platform, control plane and data plane, to be delivered to the collector module. A non-transitory computer-readable medium where the endpoint of the multi-tenant cloud platform utilizes auto-scaling properties to support a scalable and distributed environment. A non-transitory computer-readable medium where data is collected by the collector module using a push notification from the organic agents and the vendor specific agents and not a pull notification. Implementations of the described techniques may include hardware, a method or process, or a computer tangible medium.

A computer system presently disclosed may be configured to perform specific operations or actions through the installation of software, firmware, hardware, or a combination thereof on the system. These installed components, when in operation, cause the system to execute the desired actions. Additionally, one or more computer programs may be configured to perform particular operations or actions through the inclusion of instructions that, when executed by a data processing device, cause the device to perform the specified actions. The present disclosure may further provide software modules as a self-contained component of the system that performs a specific function or set of functions.

In one example, the system may include a storage device; and a processor executing program instructions stored in the storage device and being configured to: install agents and the on-site IT infrastructure components by an end-user; add devices or endpoints to be monitored to a collector collect the data from the organic agents and vendor specific agents/APIs; establish connection between collector and devices; normalize and correlating data received from subsystems from the device; stream meaningful data over a secure and reliable channel to the cloud; and create multi-vendor lake and populate for application consumption in raw and tabularized format. Other examples of this aspect include corresponding computer systems, apparatus, and computer programs recorded on one or more computer storage devices, each configured to perform the actions of the methods.

Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE DISCLOSURE

Embodiments of the present invention that are described herein provide improved methods and systems for creating a multi-vendor data lake.

Figure 1:
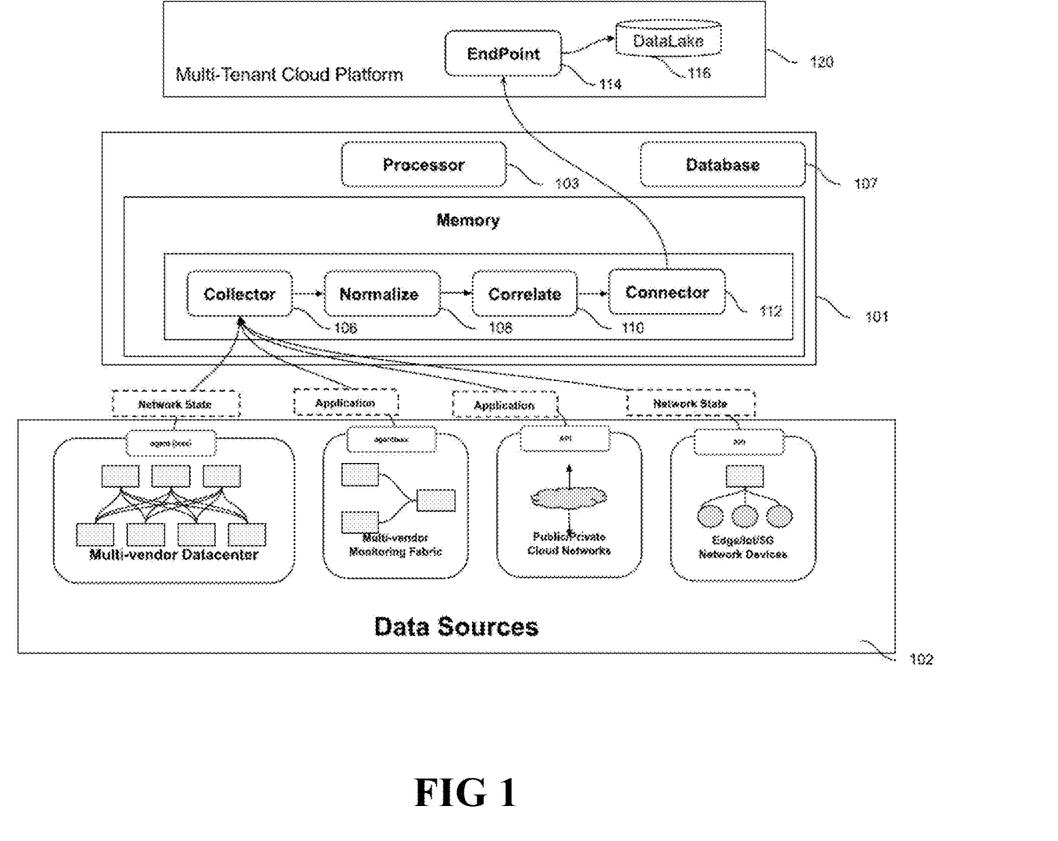
FIG. 1 illustrates a system comprising at least a processor, memory, and a database, wherein the system may communicate with one or more data sources.

FIG. 1 is a block diagram that schematically illustrates a computing system 101, in accordance with an embodiment of the present invention. System 101 may comprise, for example, a data center, a high-performance system, or a similar computing system. According to an embodiment, system 101 further comprises a processor 103, memory 105, and a database 107, wherein the system may communicate with one or more data sources 102 via a collector module 106. The system 101 may also be configured to communicate with external devices, such as user devices, to receive input and provide output.

The data sources 102 may include all industries where network infrastructure exists. Data sources 102 can be, for example, Enterprise data centers, cloud networks—both public and private, network devices for IoTs and edge 5G networks or cellular networks, or any other networks which connect compute/storage devices.

It can be appreciated that according to this exemplary system, a data lake can exist in a multitude of locations if it has the required underline infrastructure available. Locations can include on-premises data centers, cloud agnostic data infrastructure, and public cloud specific infrastructure. The amount of data in these data centers also may vary depending on customer use cases, for example NetOps use cases, data analytics use cases or security use cases.

System 101 may further comprise a number of proprietary modules that are connected in a seamless and efficient process, thus allowing for efficient and accurate transformation of the input data. At this stage the data collected from collector module 106 varies in syntax, type and value ranges because of the various hardware and software specifications across the various data sources.

According to an example, collector module 106 is configured to collect all the data from data sources 102. According to further example, data sources 102 further comprises proposed agents and vendor agents. According to a further example, data is collected by the collector module 106 by using a push notification from the agents rather than a pull, thus reducing the complexity of the collector design. Data sources can include organic agents to extract network state including platform, control plane and data plane. Data sources can also be agentless, which will use the existing network infrastructure components like SYSLOG, SNMP for network state and sFlow, netflow, metadata extraction using control plane rules. Data sources can also be connected to APIs and use vendor provided APIs provided by the network infrastructure.

Normalizer module 108 is configured to normalize the data collected by the collector module 106 across data sources 102. a unified insight or unified state of the multi-vendor environment. Once the data has been processed by normalizer module 108, it is fed into correlate module 110 which critically implements noise reduction and transforms the normalized data into a targeted optimized data that is ready for exporting to the cloud data lake.

According to a further example, correlate module 110 correlates the time-series data points across the various sub-systems and creates a single stream of data. Examples of sub-systems that may be used by the system include, but are not limited to, syslog, APIs, traffic, failures, application data generated by the system or its users, and user data provided by individuals interacting with the system. There are various use cases for single stream of data created by correlate module 110, including network utilization monitoring, anomaly detection, and failure analysis. It can be appreciated that system is designed to be flexible and adaptable, allowing it to be applied to a wide range of applications and industries. Once correlate module 110 has created the single stream of data it is ready to be sent to connector module 112 and eventually exported.

Connector module 112 is responsible for the export of the data prepared by correlate module 110 from the on-site IT infrastructure datacenter to the Multi-Tenant Cloud Platform 120 by creating a data cloud connector. It can be appreciated that connector module 112 supports connecting to various cloud endpoints which are cloud agnostic and also transports the data over a secured and persistent channel. According to an example, connector module 112 also serializes the data into a compressed format for better performance.

According to an example, Endpoint 114 can be a managed cloud service which will receive the data cloud connector from connector module 112. According to a further example, Endpoint 114 utilizes auto-scaling properties to support scalable and distributed environments. Endpoint 114 also de-serializes the data received and pushes the multi-vendor data to the database hosted in the cloud infrastructure.

According to an example, DataLake 116 is a cloud agnostic database which maintains the time-series data received from the on-site IT infrastructure, maintains raw and tabularized data. In a further example, the raw data format can be used by Artificial Intelligence and machine learning applications for various use cases relating to alerting, prediction, forecasting and deriving automatic troubleshooting. The tabularized data is consumed by observability applications for creating various dashboards for trend analysis and reporting.

Figure 2:
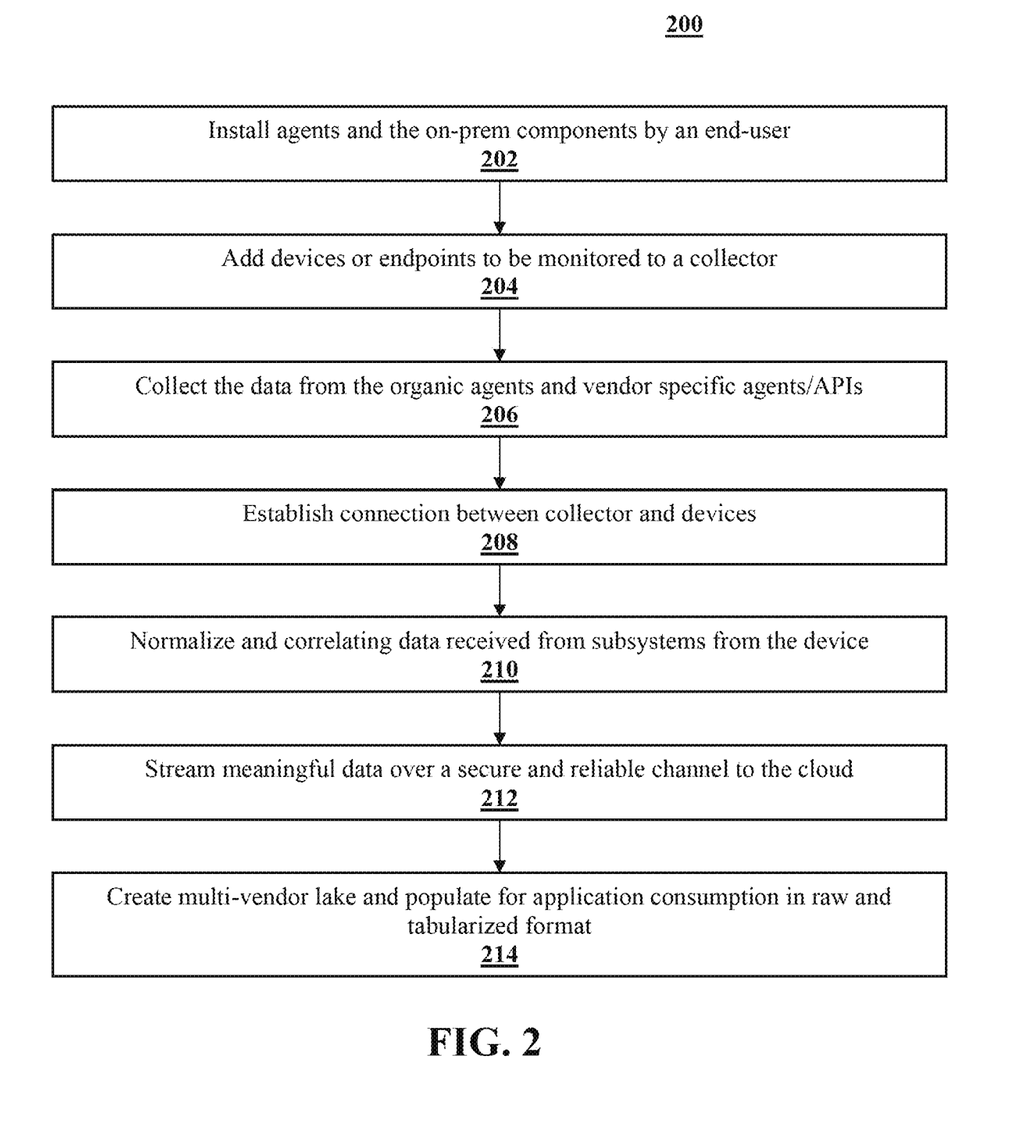
FIG. 2 is a flow chart that schematically illustrates a method of creating a data lake, according to an example of the present disclosure.

FIG. 2 is a flowchart of an exemplary process 200. In some implementations, one or more process blocks of FIG. 2 may be performed by a device.

As shown in FIG. 2, process 200 may include installing agents and the on-site IT infrastructure components by an end-user (block 202). For example, the process may install agents and the on-site IT infrastructure components by an end-user, as described above. As also shown in FIG. 2, process 200 may include adding devices or endpoints to be monitored to a collector module (block 204). For example, the process may add devices or endpoints to be monitored to a collector module, as described above. As further shown in FIG. 2, process 200 may include collecting the data from the organic agents and vendor specific agents/APIs (block 206). For example, the process may collect the data from the organic agents and vendor specific agents/apis, as described above. As also shown in FIG. 2, process 200 may include establishing connection between the collector module and devices (block 208). For example, the process may establish connection between the collector module and devices, as described above. As further shown in FIG. 2, process 200 may include normalizing and correlating data received from subsystems from the device (block 210). For example, the process may normalize and correlating data received from subsystems from the device, as described above. As also shown in FIG. 2, process 200 may include streaming meaningful data over a secure and reliable channel to the cloud (block 212). For example, the process may stream meaningful data over a secure and reliable channel to the cloud, as described above. As further shown in FIG. 2, process 200 may include creating multi-vendor lake and populate for application consumption in raw and tabularized format (block 214). For example, the process may create the multi-vendor lake and populate it for application consumption in raw and tabularized format, as described above.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

Figure 3A:
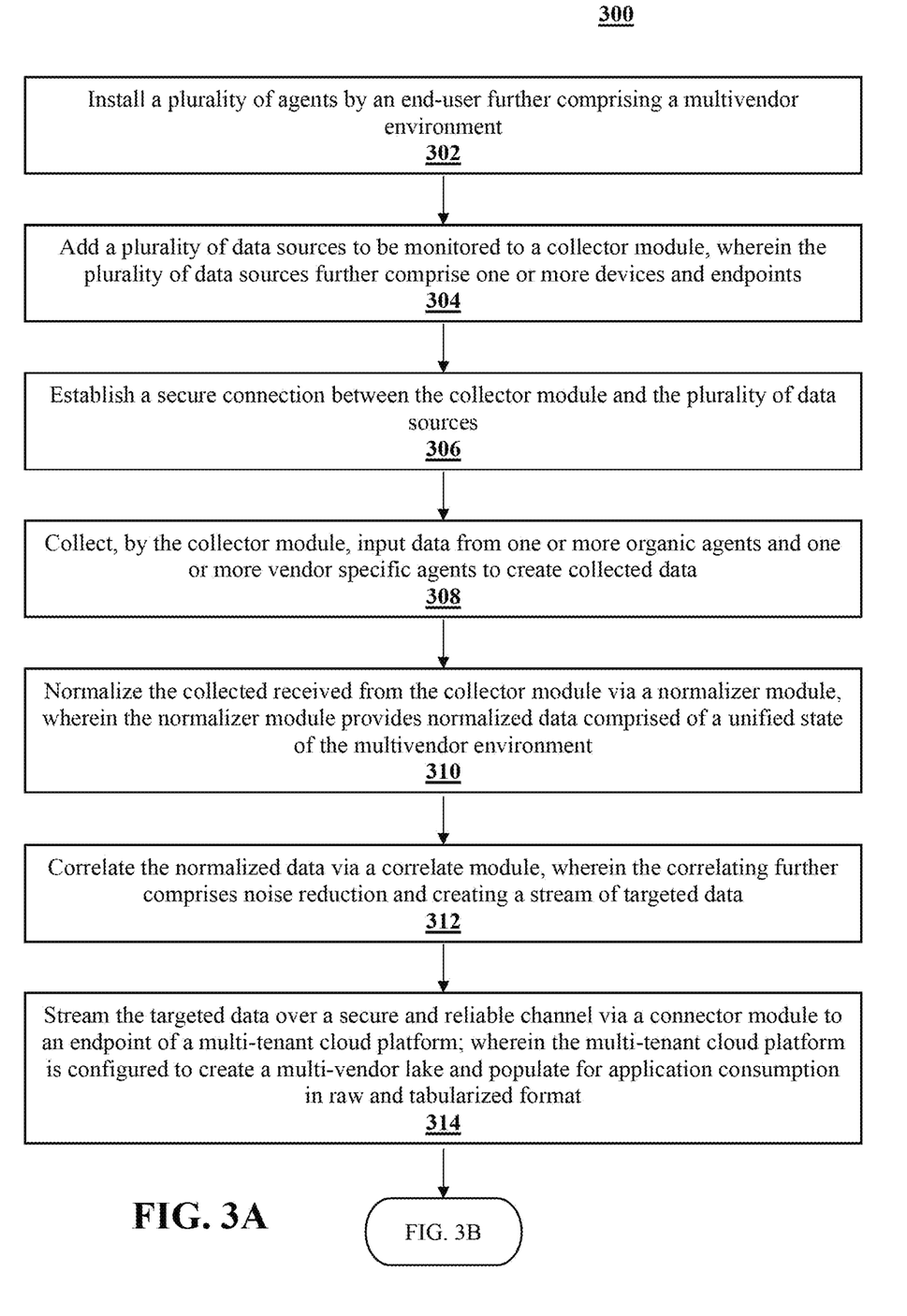
FIG. 3A is a flow chart that schematically illustrates a method of creating a data lake according to an example of the present disclosure.
Figure 3B:
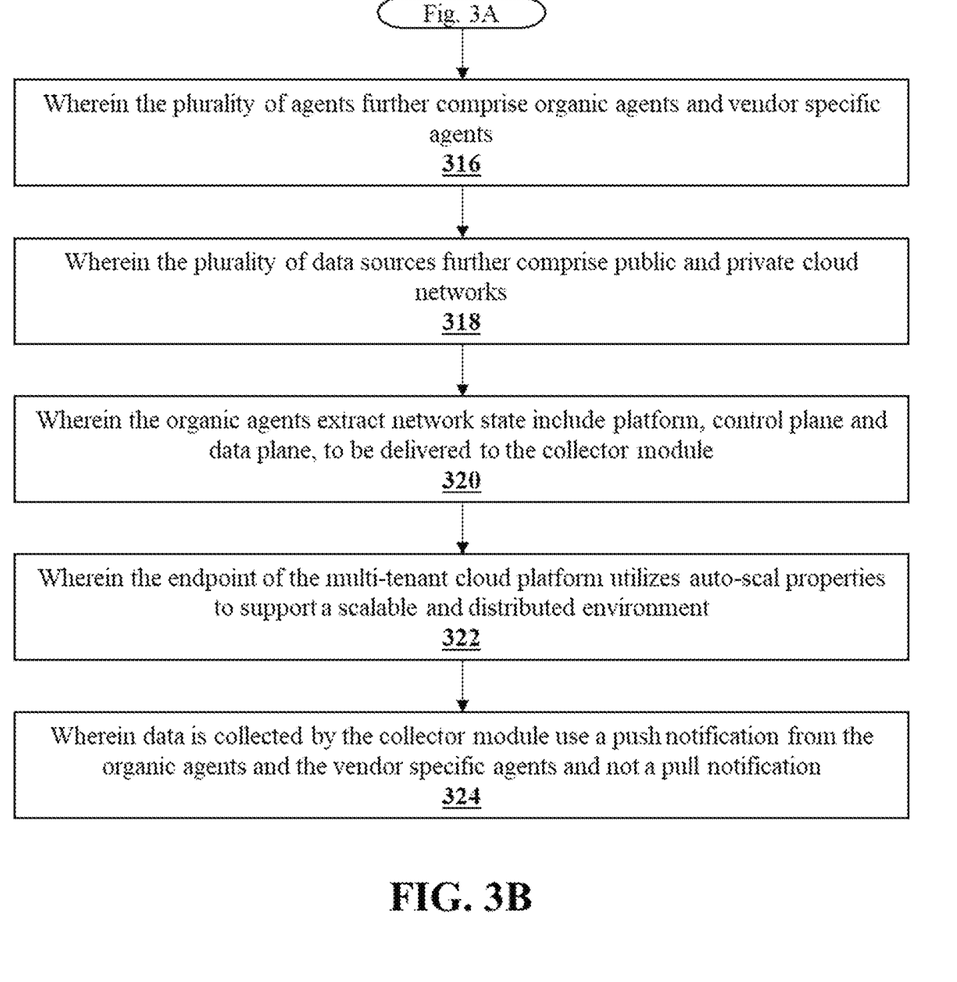
FIG. 3B is a flow chart that is a continuation of FIG. 3A and schematically illustrates a method of creating a data lake according to an example of the present disclosure.

FIG. 3A is a flow chart of a more detailed process 300, according to an example of the present disclosure. FIG. 3B is a flow chart that is a continuation of FIG. 3A and schematically illustrates a method of creating a data lake according to an example of the present disclosure. According to an example, one or more process blocks of FIG. 3A and FIG. 3B may be performed by device.

As shown in FIG. 3A, process 300 may include installing a plurality of agents by an end-user may include a multi-vendor environment (block 302). For example, the process may install a plurality of agents by an end-user may include a multivendor environment, as described above. As in addition shown in FIG. 3A, process 300 may include adding a plurality of data sources to be monitored to a collector module, where the plurality of data sources further may include of one or more devices and endpoints (block 304). For example, the process may add a plurality of data sources to be monitored to a collector module, where the plurality of data sources further may include of one or more devices and endpoints, as described above. As also shown in FIG. 3A, process 300 may include establishing a secure connection between the collector module and the plurality of data sources (block 306). For example, the process may establish a secure connection between the collector module and the plurality of data sources, as described above. As further shown in FIG. 3A, process 300 may include collecting, by the collector module, input data from one or more organic agents and one or more vendor specific agents to create collected data (block 308). For example, the process may collect, by the collector module, input data from one or more organic agents and one or more vendor specific agents to create collected data, as described above. As in addition shown in FIG. 3A, process 300 may include normalizing the collected received from the collector module via a normalizer module, where the normalizer module provides normalized data may include of a unified state of the multivendor environment (block 310). For example, the process may normalize the collected received from the collector module via a normalizer module, where the normalizer module provides normalized data may include of a unified state of the multivendor environment, as described above. As also shown in FIG. 3A, process 300 may include correlating the normalized data via a correlate module, where the correlating further may include noise reduction and creating a stream of targeted data (block 312). For example, the process may correlate the normalized data via a correlate module, where the correlating further may include noise reduction and creating a stream of targeted data, as described above. As further shown in FIG. 3A, process 300 may include streaming the targeted data over a secure and reliable channel via a connector module to an endpoint of a multi-tenant cloud platform; where the multi-tenant cloud platform is configured to create a multi-vendor lake and populate for application consumption in raw and tabularized format (block 314). For example, the process may stream the targeted data over a secure and reliable channel via a connector module to an endpoint of a multi-tenant cloud platform; where the multi-tenant cloud platform is configured to create a multi-vendor lake and populate for application consumption in raw and tabularized format, as described above. As further shown in FIG. 3B, process 300 may include the plurality of agents further comprising organic agents and vendor specific agents (block 316). As further shown in FIG. 3B, process 300 may include the plurality of data sources further comprising public and private cloud networks (block 318). As further shown in FIG. 3B, process 300 may include the organic agents extracting network state including platform, control plane, and data plane to be delivered to the collector module (block 320). As further shown in FIG. 3B, process 300 may include the endpoint of the multi-tenant cloud platform utilizing auto-scale properties to support a scalable and distributed environment (block 322). As further shown in FIG. 3B, process 300 may include data collected by the collector module using a push notification from the organic agents and the vendor specific agents and not a pull notification (block 324).

Process 300 may include additional implementations, such as any single implementation or any combination of implementations described below and/or in connection with one or more other processes described elsewhere herein. In a first implementation, the plurality of agents further may include organic agents and vendor specific agents.

In a second implementation, alone or in combination with the first implementation, the plurality of data sources further may include public and private cloud networks.

In a third implementation, alone or in combination with the first and second implementation, the organic agents extract network state including platform, control plane and data plane, to be delivered to the collector module.

In a fourth implementation, alone or in combination with one or more of the first through third implementations, the endpoint of the multi-tenant cloud platform utilizes auto-scaling properties to support a scalable and distributed environment.

In a fifth implementation, alone or in combination with one or more of the first through fourth implementations, data is collected by the collector module using a push notification from the organic agents and the vendor specific agents and not a pull notification.

It should be noted that while FIG. 3A and FIG. 3B shows example blocks of process 300, in some implementations, process 300 may include additional blocks, fewer blocks, different blocks, or differently arranged blocks than those depicted in FIG. 3A and FIG. 3B. Additionally, or alternatively, two or more of the blocks of process 300 may be performed in parallel.

Modifications, additions, or omissions may be made to the systems, methods, and/or methods described herein without departing from the scope of the disclosure. For example, various components of the systems and methods may be integrated or separated. Moreover, the operations of the systems and methods disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

It will be further apparent to one skilled in this art that the improvements provided for in the present disclosure, while described with relation to certain specific physical examples also lend themselves to being applied in other physical arrangements not specifically provided for herein, which are nonetheless with the spirit and scope of the disclosure taught here.

The invention claimed is:

1. A method for creating a multi-vendor data lake, comprising:
   installing, by an end user, a plurality of agents in a multivendor environment;
   adding a plurality of data sources to be monitored to a collector module, wherein the plurality of data sources further comprise one or more devices and endpoints;
   establishing a secure connection between the collector module and the plurality of data sources;
   collecting, by the collector module, input data from one or more organic agents and one or more vendor specific agents to create collected data, wherein data is collected by the collector module using a push notification from the organic agents and the vendor specific agents and not a pull notification;
   normalizing the collected data received from the collector module via a normalizer module, wherein the normalizer module provides normalized data comprised of a unified state of the multivendor environment;
   correlating the normalized data via a correlate module based on a predetermined condition that collected data has been normalized via the normalizer module, wherein the correlating correlates time-series data points and executes noise reduction to create a single stream of targeted data; and
   streaming the single stream of targeted data over a secure and reliable channel via a connector module to an endpoint of a multi-tenant cloud platform based on the predetermined condition that the correlator module has created the single stream of targeted data, wherein the multi-tenant cloud platform is configured to create a multi-vendor data lake and populate for application consumption in at least a tabularized format, and wherein the data lake ingests data from heterogeneous network equipment and provide access to a plurality of applications using any kind of public cloud.

2. The method of claim 1, wherein the plurality of agents further comprise organic agents and vendor specific agents.

3. The method of claim 1, wherein the plurality of data sources further comprise public and private cloud networks.

4. The method of claim 3, wherein the organic agents extract network state including platform, control plane and data plane, to be delivered to the collector module.

5. A system for creating a multi-vendor data lake comprising:
   one or more processors configured to:
   install, by an end user, a plurality of agents by an end-user in a multivendor environment;
   add a plurality of data sources to be monitored to a collector module, wherein the plurality of data sources further comprise one or more devices and endpoints;
   establish a secure connection between the collector module and the plurality of data sources;
   collect, by the collector module, input data from one or more organic agents and one or more vendor specific agents to create collected data, wherein data is collected by the collector module using a push notification from the organic agents and the vendor specific agents and not a pull notification;
   normalize the collected data received from the collector module via a normalizer module, wherein the normalizer module provides normalized data comprised of a unified state of the multivendor environment;
   correlate the normalized data via a correlate module based on a predetermined condition that collected data has been normalized via the normalizer module, wherein the correlating further comprises noise reduction and creating a single stream of targeted data; and
   stream the targeted data over a secure and reliable channel via a connector module to an endpoint of a multi-tenant cloud platform based on the predetermined condition that the correlator module has created the single stream of targeted data;
   wherein the multi-tenant cloud platform is configured to create a multi-vendor data lake and populate for application consumption in at least a tabularized format.

6. The system of claim 5, wherein the plurality of agents further comprise organic agents and vendor specific agents.

7. The system of claim 5, wherein the plurality of data sources further comprise public and private cloud networks.

8. The system of claim 7, wherein the organic agents extract network state including platform, control plane and data plane, to be delivered to the collector module.

9. The system of claim 8, wherein the endpoint of the multi-tenant cloud platform utilizes auto-scaling properties to support a scalable and distributed environment.

10. The system of claim 9, wherein data is collected by the collector module using a push notification from the organic agents and the vendor specific agents and not a pull notification.

11. A non-transitory computer-readable medium storing a set of instructions for creating a multi-vendor data lake, the set of instructions comprising:
    one or more instructions that, when executed by one or more processors of a device, cause the device to:
    install, by an end user, a plurality of agents by an end in a multivendor environment;
    add a plurality of data sources to be monitored to a collector module, wherein the plurality of data sources further comprise one or more devices and endpoints;
    establish a secure connection between the collector module and the plurality of data sources;
    collect, by the collector module, input data from one or more organic agents and one or more vendor specific agents to create collected data, wherein data is collected by the collector module using a push notification from the organic agents and the vendor specific agents and not a pull notification;
    normalize the collected data received from the collector module via a normalizer module, wherein the normalizer module provides normalized data comprised of a unified state of the multivendor environment;
    correlate the normalized data via a correlate module based on a predetermined condition that collected data has been normalized via the normalizer module, wherein the correlating further comprises noise reduction and creating a single stream of targeted data; and
    stream the targeted data over a secure and reliable channel via a connector module to an endpoint of a multi-tenant cloud platform,
    wherein the multi-tenant cloud platform is configured to create a multi-vendor data lake and populate for application consumption in at least a tabularized format.

12. The non-transitory computer-readable medium of claim 11, wherein the plurality of agents further comprise organic agents and vendor specific agents.

13. The non-transitory computer-readable medium of claim 11, wherein the plurality of data sources further comprise public and private cloud networks.

14. The non-transitory computer-readable medium of claim 13, wherein the organic agents extract network state including platform, control plane and data plane, to be delivered to the collector module.

15. The non-transitory computer-readable medium of claim 14, wherein the endpoint of the multi-tenant cloud platform utilizes auto-scaling properties to support a scalable and distributed environment.

16. The non-transitory computer-readable medium of claim 15, wherein data is collected by the collector module using a push notification from the organic agents and the vendor specific agents and not a pull notification.

* * * * *